United States Patent
Joyce

(10) Patent No.: US 8,204,667 B2
(45) Date of Patent: Jun. 19, 2012

(54) METHOD FOR COMPENSATING FOR NORMAL FORCES IN ANTILOCK CONTROL

(75) Inventor: John Patrick Joyce, West Bloomfield, MI (US)

(73) Assignee: Ford Global Technologies, Dearborn, MI (US)

( * ) Notice: Subject to any disclaimer, the term of this patent is extended or adjusted under 35 U.S.C. 154(b) by 607 days.

(21) Appl. No.: 12/405,421

(22) Filed: Mar. 17, 2009

(65) Prior Publication Data

US 2009/0306872 A1  Dec. 10, 2009

Related U.S. Application Data

(60) Provisional application No. 61/060,098, filed on Jun. 9, 2008.

(51) Int. Cl.
*B60T 8/1761* (2006.01)
*G06F 19/00* (2006.01)

(52) U.S. Cl. .............. 701/76; 701/73; 701/91; 303/150; 180/408

(58) Field of Classification Search ............... 701/76, 701/73, 67, 48, 91; 303/150, 121; 280/5.518; 180/408, 422
See application file for complete search history.

(56) References Cited

U.S. PATENT DOCUMENTS

| | | | |
|---|---|---|---|
| 6,549,842 B1* | 4/2003 | Hac et al. ................. | 701/80 |
| 6,892,123 B2* | 5/2005 | Hac ........................... | 701/48 |
| 2003/0154012 A1* | 8/2003 | Anwar ....................... | 701/71 |
| 2004/0030477 A1* | 2/2004 | Gerdes ...................... | 701/48 |

* cited by examiner

*Primary Examiner* — Tan Q Nguyen
(74) *Attorney, Agent, or Firm* — Angela M. Brunetti; Fredrick Owens

(57) ABSTRACT

A method for controlling an antilock brake system on a vehicle, the method comprising calculating a prediction of tire normal forces and modifying a brake torque applied to a brake based on the predicted tire normal forces. The prediction of tire normal forces may be calculated using predicted longitudinal forces or estimates of longitudinal forces that are obtained by predicting a master-cylinder pressure.

60 Claims, 2 Drawing Sheets

METHOD FOR COMPENSATING FOR NORMAL FORCES IN ANTILOCK CONTROL

CROSS REFERENCE TO RELATED APPLICATIONS

This application claims the benefit of the filing date of U.S. Provisional Patent Application Ser. No. 61/060,098, filed Jun. 9, 2008, entitled "Compensating for Normal Forces in Antilock Control", the entire disclosure of which is hereby incorporated by reference into the present application.

TECHNICAL FIELD

The inventive subject matter is related to antilock brake control and more particularly to compensating for transient normal forces in antilock brake control.

BACKGROUND

An anti-lock braking system (ABS) on a motor vehicle prevents the wheels from locking while braking. ABS allows a driver to maintain steering control during periods of heavy braking by preventing a skid and allowing the wheel to continue to forward roll. A typical ABS has a controller, a speed sensor for each wheel, and a braking circuit. The controller controls the braking applied to the wheels in order to make them either turn faster or slower. This process is repeated constantly during braking. The brake torque is repeatedly increased and decreased in a cyclical fashion.

Longitudinal forces on the vehicle are controlled with ABS. However, it is known that the maximum amount of longitudinal force on a vehicle is typically proportional to the amount of normal force on the tires during heavy braking. When the brakes are applied at a rapid rate, the normal forces on the vehicle change substantially and quickly. In an underdamped vehicle, the normal forces can continue to oscillate throughout the stop. Much of ABS philosophy strategy assumes that normal forces and the pressures to generate wheel lock are nearly constant during a typical stop. The variation in normal forces, while well known, is typically not quantified nor is it typically used to modify brake control.

Empirical methods are typically used to manage the first cycle of ABS control. Some applications have implemented logic to limit the rate of brake applied in order to reduce the perturbance to vehicle motion. The control behavior is tuned to minimize deviations from optimum control that are observed during development testing. The current method of tuning is often used to compensate for several factors that affect control in addition to normal force variation such as; consistency of the calculation of a reference velocity, hysteresis in the brake torque/pressure relationship, the tire/road µ, the optimum deceleration of the vehicle, whether the vehicle is on split-µ, and the motion of the tire relative to the general motion of the vehicle. The addition of a sound analytical basis to account for normal force variation provides a more optimum tuning because separate parameters are used to account for normal force variation.

Several current brake control algorithms limit the rate of brake torque development during the initial application of brakes. This method reduces the rate of change of normal forces. With lower normal force variation, the control is generally subjected to less variation and achieves higher efficiency. However, in slowing the rate of brake applied, the development of deceleration is slowed and stopping distances are increased.

There is a need for a model that determines how much normal force will change on a vehicle in response to the brake applied and take into account how normal force is varying in order to modify ABS control in anticipation of the normal force in order to support optimum modulation of braking torque.

SUMMARY

The present invention provides a method for compensating for normal forces in anti-lock brake control comprising the combination of features of the independent claims, preferred optional features being introduced by the dependent claims.

Elements and steps in the figures are illustrated for simplicity and clarity and have not necessarily been rendered according to any particular sequence. For example, steps that may be performed concurrently or in different order are illustrated in the figures to help to improve understanding of the embodiments of the inventive subject matter.

DESCRIPTION OF INVENTION

While various aspects of the present invention are described with reference to a particular illustrative embodiment, the invention is not limited to such embodiments, and additional modifications, applications, and embodiments may be implemented without departing from the inventive subject matter. In the figures, like reference numbers will be used to illustrate the same components. Those skilled in the art will recognize that the various components set forth herein may be altered without varying from the scope of the inventive subject matter.

Figure 1:
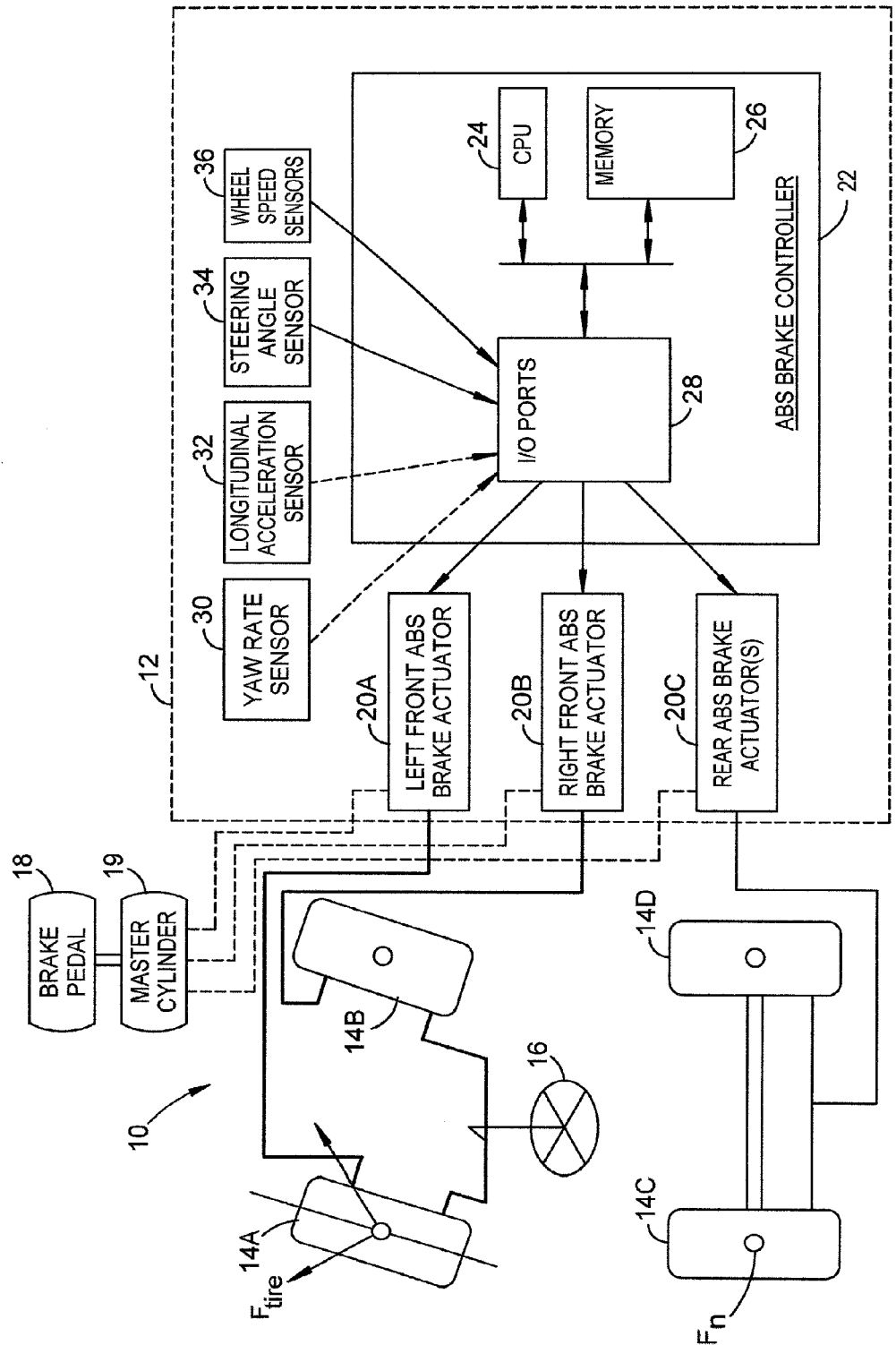
FIG. 1 is a schematic diagram of a vehicle having an anti-lock brake control system according to the inventive subject matter.

FIG. 1 shows an automotive vehicle 10 equipped with an anti-lock brake control system 12. The control system 12 controls the braking torque applied by an anti-lock brake system to one or more vehicle wheels 14A, 14B, 14C and 14D. The vehicle 10 has a steering wheel 16. The vehicle 10 also has a brake pedal 18 that is depressible, by the driver of the vehicle, to command a vehicle braking event. In a hydraulic-actuated brake system, a master-cylinder 19 generates hydraulic fluid pressure in response to the brake command input. The pressurized hydraulic fluid, in turn, applies a braking torque by way of brake actuators to engage frictional brake pads with disc or drum brake members, to resist rotation of the wheels 14A-D. It should be noted that while a hydraulic brake system is shown and described herein, the present invention is applicable to other types of brake systems and one having ordinary skill in the art is capable of applying the inventive subject matter to another type of braking system without departing from the scope of the present invention.

The anti-lock brake system 12 includes a left front ABS brake actuator 20A and a right front ABS brake actuator 20B for independently applying braking torque to the corresponding front tires 14A and 14B. In addition, a rear ABS brake actuator 20C is provided for applying braking torque to each of the rear tires 14C and 14D. It should be noted that the rear ABS brake actuator 20C may include a single brake actuator commonly shared by both tires 14C and 14D, or it may include separate independent ABS brake actuators for each of the tires in similar fashion to the actuators 20A and 20B.

The anti-lock brake system 12 further includes an ABS brake controller 22 for controlling the braking operation, including adjusting the braking torque applied to the tires 14A-14D. The brake controller 22 preferably includes a microprocessor 24 and memory 26 for storing and processing one or more brake control algorithms. The controller hardware may include a commercially available controller. In particular, controller 22 includes input/output (I/O) ports 28, the central processing unit (CPU) 24, and memory 26. The controller 22 receives various sensed signals from sensors, as shown, and in response to the brake control algorithm(s), generates output control signals to each of the brake actuators 20A-20C.

The brake controller may receive a sensed steering angle signal from a steering angle sensor 34, and sensed wheel speed signals from wheel sped sensors 36, associated with each of the wheels/tires 14A-14D. The sensed steering angle signal provides an indication as to whether the steering wheel is turned, relative to a straight line vehicle travel command, so as to command the vehicle to turn. A steering angle turn event is established whenever the sensed steering angle deviates from the straight line vehicle trajectory by greater than a determined amount. Accordingly, the vehicle is determined to be traveling in a straight line provided the steering angle is within the determined amount.

The brake controller 22 may also receive a sensed yaw signal from a yaw rate sensor 30 and sensed longitudinal acceleration signal from a longitudinal acceleration sensor 32. A yaw rate sensor 30 provides a yaw signal which indicates whether or not the vehicle is yawing, independent of whether the steering wheel is turned. If all vehicle wheels are operative at high slip while the vehicle is still moving, it can be difficult to accurately determine vehicle speed. The longitudinal acceleration sensor 32 provides a signal as a means to determine more accurate vehicle speed during a braking event, particularly when relatively high tire slip occurs. Preferably, the longitudinal acceleration sensor 32 is a biaxial sensor that is capable of inferring vehicle angle to the force of gravity in addition to vehicle deceleration.

Normal force, $F_n$, is the force associated with the vehicle's static weight, which acts downwardly through the road wheel tire 14A-14D. However, it may include dynamic changes due to pitch and roll. A tire lateral force, $F_{tire}$, is a measure of the lateral tire force developed at the interface of the tire with the road. The variation in normal forces is not typically quantified in antilock control. The inventive subject matter quantifies the normal forces on the tires and applies it to the ABS to modify ABS control.

Figure 2:
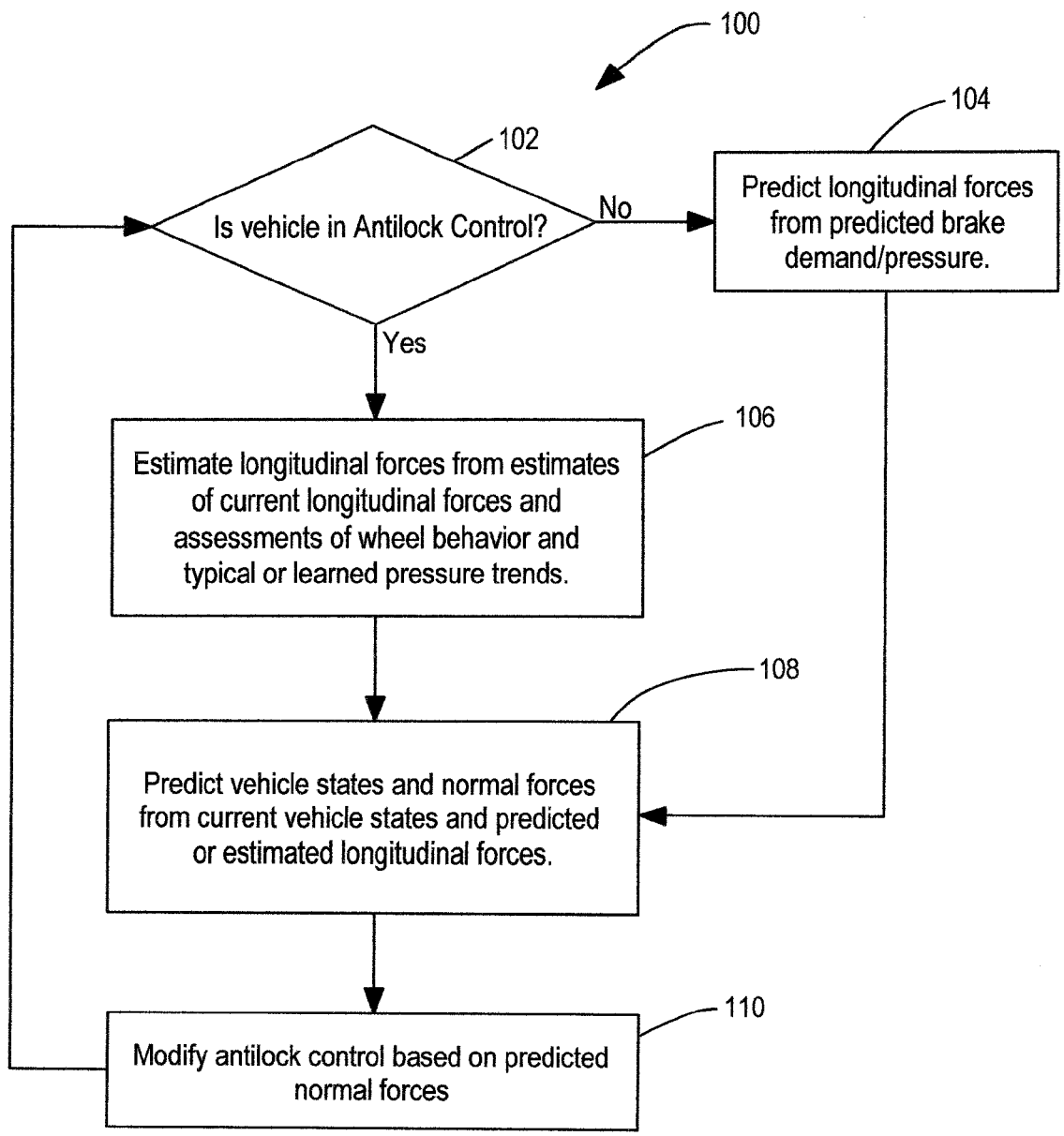
FIG. 2 is a flow diagram illustrating a method of controlling the anti-lock brake control system to deliver optimum deceleration according to the inventive subject matter.

The ABS brake controller 22 is programmed in memory 26 to perform a brake control method 100 according to the inventive subject matter as shown in the logic diagram of FIG. 2. The method 100 predicts actual and anticipated normal forces on the tires and uses the predictions to modify antilock control, thereby improving the efficiency. The inventive subject matter achieves increased efficiency with a high rate of brake application. Increased efficiency is realized in the ability of the inventive subject matter to deliver improved deceleration through antilock control while reducing excess tire slip. Improved deceleration improves stopping distance. Reduced excess tire slip improves control and stability of the vehicle. Reduced excess tire slip may also improve the noise, vibration and harshness of the vehicle. Throughout the specification, estimations use immediately available and past data while predictions are based on projections. The predictions may be based on projections from trends established in past data or patterns that have historically been observed. An estimation is a value that applies to the current state of operation. A prediction is a value that applies to a future state of operation.

The method begins with the controller making a determination 102 of whether the vehicle is in antilock control. Predictions 104 or estimations 106 of longitudinal tire forces are then made depending on the state of the antilock brake system. In the event the vehicle is not in antilock control, longitudinal forces are predicted 104 from predicted brake demand and predicted brake pressure. Predictions of future longitudinal forces may be based on assessments of wheel behavior and typical or learned pressure trends. For example it is typical that the lowest longitudinal force and brake pressure happens immediately after a wheel has reaccelerated after a pressure decrease.

In the event the vehicle is in antilock control, the longitudinal tire forces are estimated 106 from estimates of current longitudinal forces and an assessment of wheel behavior in conjunction with typical or learned trends in brake pressure. Estimates of current longitudinal forces may be based on current estimates of brake pressures and wheel accelerations. After antilock control begins, predictions of normal forces may be made by estimating the deceleration of the vehicle given estimates of longitudinal forces.

Depending on the state of antilock brake control, either the predicted longitudinal forces 104 or the estimated longitudinal forces 106 are used, along with current vehicle states, to predict 108 vehicle states and tire normal forces. Predictions of actual and anticipated normal forces may be derived from a number of values and signals available in a typical antilock brake system and described above with reference to FIG. 1. The equations that follow describe the estimation of normal forces at any point in time, given the master-cylinder pressure over time. The normal forces are predicted by predicting the master-cylinder pressure.

Total brake torque, $T_b$, is estimated from the master-cylinder brake pressure, $P_{mc}$ as shown in Equations (1) and (2). $G_b$ is brake gain and $C_b$ is a brake constant.

$$\partial T_b/\partial t = (G_b \cdot P_{mc} - T_b) \cdot C_b \tag{1}$$

$$T_b = \int \partial T_b/\partial t \tag{2}$$

Total vehicle acceleration ($A_v$) is estimated from vehicle acceleration ($A_v$), vehicle mass ($M_v$) and the tire radius ($R_t$):

$$A_v = T_b/(M_v \cdot R_t) \tag{3}$$

$$\partial A_v/\partial t = \partial T_b/\partial t = (G_b \cdot P_{mc} - T_b) \cdot C_b \tag{4}$$

Constants $Z_{fa}$ and $Z_{ra}$ relate the vertical motion of the vehicle at one axle to the pitch of the vehicle. If the vehicle rises equally over both front and rear axles, the pitch does not change. If the front rises more than the rear, the vehicle pitches up. If the rear rises more than the front, the vehicle pitches down. The forces at work that are pushing up and down on the front and rear of the vehicle are springs and shocks. When the vehicle is braking, the longitudinal tire forces that decelerate the vehicle create a torque about the vehicle in the pitch axis that attempts to raise the rear of the vehicle and lower the front of the vehicle. As the vehicle pitches, the spring s and shocks develop forces that create a counteracting torque. The result is that the vehicle begins to pitch very quickly. As it pitches, the spring and shock forces change to oppose the pitching motion and a new pitch angle is reached such that the torque from the spring and shock forces is equal and opposite to the torque from the longitudinal tire forces.

Tire normal forces ($F_{z\_fa}$, $F_{z\_ra}$) may be predicted 108 by simultaneously solving the following nine equations with nine unknowns ($\alpha_p$, $F_{z\_fa}$, $F_{z\_ra}$, $Z_{fa}$, $Z_{ra}$, $\partial Z_{fa}/\partial t$, $\partial Z_{ra}/\partial t$, $\omega_p$, $v_p$) given constants representing the influence of suspension springs ($K_{p\_fa}$, $K_{p\_ra}$) and suspension damping elements ($K_{d\_fa}$, $K_{d\_ra}$), and basic vehicle geometry, where $M_v$ is the mass of the vehicle, $L_{fa}$ is the longitudinal distance from the vehicle center of gravity to the front axle, $L_{ra}$ is the longitudinal distance from the vehicle center of gravity to the rear tire axle, $C_{gh}$ is the height of the center of gravity of the vehicle above the road surface, and $I_p$ is the rotational inertia of the vehicle about the pitch axis. In the following equations, $\alpha_p$ is the angular acceleration of the vehicle about the pitch axis, $Z_{fa}$ is the constant that relates the vertical motion of the vehicle at the front axle to the pitch of the vehicle, $Z_{ra}$ is the constant that relates the vertical motion of the vehicle at the rear axle to the pitch of the vehicle, $\omega_p$ is the angular velocity of the vehicle about the pitch axis, and $\theta_p$ is the angle of the vehicle about the pitch axis:

$$\alpha_p = (M_v \cdot Av \cdot Cgh + Fz\_fa \cdot Lfa + Fz\_ra \cdot Lra)/Ip \quad (5)$$

$$F_{z\_fa} = K_{p\_fa} \cdot Z_{fa} + K_{d\_fa} \cdot \partial Z_{fa}/\partial t \quad (6)$$

$$F_{z\_ra} = K_{p\_ra} \cdot Z_{ra} + K_{d\_ra} \cdot \partial Z_{ra}/\partial t \quad (7)$$

$$\omega_p = \int \alpha_p \quad (8)$$

$$\theta_p = \int \omega_p \quad (9)$$

$$\theta_p = (z_{ra} - Z_{fa})/(L_{fa} - L_{ra}) \quad (10)$$

$$\omega_p = (\partial Z_{ra}/\partial t - \partial Z_{fa}/\partial t)/(L_{fa} - L_{ra}) \quad (11)$$

$$Z_{fa} = \int \partial Z_{fa}/\partial t \quad (12)$$

$$Z_{ra} = \int \partial Z_{ra}/\partial t \quad (13)$$

In solving the above nine equations, namely equations (5) through (13), for nine unknowns, the solutions may include any of the following features and/or assumptions: at low master-cylinder pressures an assumption is made that the rate of change will increase; at high master-cylinder pressures an assumption is made that the rate of change will decrease; and a limit is provided for the predicted master-cylinder pressure resulting in a maximum value. Accuracy of the predictions of current and anticipated normal forces 108 according to the inventive subject matter may be improved by adding information from any of the following sources: wheel-end brake pressures (either estimated or measured values); vehicle geometry; longitudinal acceleration; mass/center-of-gravity location estimates from other control algorithms; suspension height sensors; suspension geometry; changes in suspension stiffness according to travel; reaction forces due to interaction of suspension forces with brake torques; grade estimates; powertrain torque; and differences in left-to-right normal forces due to vehicle construction, loading, operating condition. All of this information is available from systems typically available on a vehicle and may be accessed by the antilock brake control system.

The predicted normal forces are used to modify antilock control 110. Modifying antilock control 110 based on normal force predictions may be accomplished by modifying pressure commands passed to a pressure controller or by direct modifications of valve commands. The modifications to valve commands may take the form of either valve activation times or valve openings, typically controlled by modulating valve current. The following modifications may be followed in the control 110: modify the limit on the maximum predicted master-cylinder pressure depending on measured or estimated engine vacuum; modify the predicted profile of master-cylinder pressure based on models of human apply characteristics; and modify the predicted profile of master-cylinder pressure based on expected responses of the brake system (e.g. triggering of brake assist function).

A modification of the limit of maximum master-cylinder pressure that considers human apply characteristics may apply a limit based on any of the following relationships: an absolute maximum pedal force//master-cylinder pressure achievable by drivers in controlled tests; distributions of pedal forces/master-cylinder pressures achieved by typical drivers during real or simulated emergency braking events; distributions of pedal forces/master-cylinder pressures achieved by typical drivers during ordinary braking event; correlations between maximum pedal forces/master-cylinder pressures and driver ergonomic data available, such as seat position, adjustable pedal position, telescopic steering wheel position, steering wheel tilt position, and driver mass or size; correlations between maximum pedal force/master-cylinder pressure data and rates of brake apply; correlations between maximum pedal force/master-cylinder pressure data and vehicle dynamic conditions such as grade, lateral acceleration and steering wheel angle; correlations between maximum pedal force/master-cylinder pressure data and personal information provided by the driver. These relationships are presented for example purposes only and other relationships may exist or may be developed depending on the technology available.

In general, as normal forces increase, commands are biased to increase pressure and as normal forces decrease, commands are biased to decrease pressure. Similarly, in all cases, application of the modifications 110 can be modified or suspended based on lateral acceleration, yaw rate, vehicle speed, recent or current traction control activation, recent or current stability control activation, variations in inertial signals or wheel speeds due to rough road or dynamic handling situation, steering wheel movement, etc. All of this information is available from systems typically available on a vehicle and may be accessed by the antilock brake control system.

In one embodiment of the inventive subject matter, the commands to increase or decrease brake pressure 110 may be biased according to a variation of normal force predicted by the model. In this static form of control, also the simplest form, the modifications are fixed and may only be invoked when conditions likely to cause the significant normal force variation are present. The modifications 110 may be scheduled according to time. Application of the modifications 110 may be triggered by rates of brake pedal travel, master-cylinder pressure, or a change in longitudinal acceleration.

In another embodiment, the commands to increase or decrease brake pressure 110 may be biased dynamically according to variation of normal force predicted in the model. In this dynamic form, modifications 110 are calculated dynamically and reflect the amount of normal force variation predicted by the model. For example, a base pressure change or valve activation time may be calculated based on the current and recently observed wheel behavior. The pressure change or valve activation time would be modified according to a difference between a predicted normal force and a current estimate of normal force.

In another example of dynamically modifying the commands, a predetermined, or target, wheel acceleration is identified as an indicator for modifying brake pressure 110 according to the inventive subject matter. A predetermined, or target pressure may be modified based on wheel acceleration expected from changes in normal force. The commands controlling brake pressure are assessed in terms of the pressure targets, while the pressure targets are assessed in terms of the target wheel acceleration. The pressure targets may then be modified to account for at least some of the change in wheel acceleration that will occur as a result of the normal force variation. According to the inventive subject matter, the modified pressure targets are passed on as commands to modify brake pressure 110.

In still another example, a target pressure may be identified. The target pressure may be modified based on expected changes in normal force to improve proportionality of brake pressure target with normal force. The commands controlling brake pressure are assessed in terms of pressure targets while the pressure targets are assessed in terms of a proportion of normal force. The pressure targets are modified to account for at least some of the change due to normal force variation. The modified pressure targets are passed on as commands to modify brake pressure 110.

The inventive subject matter is advantageous in that predictions of actual and anticipated tire normal forces may be used to modify antilock brake control, thereby improving the efficiency of antilock brake control. Another advantage realized by modeling normal forces is that the predictions may be derived from a number of values and signals already available on systems present on a vehicle. The inventive subject matter allows a rapid development of braking torque and provides high efficiency by explicitly accounting for the variation in normal tire force and thereby modifying the antilock brake control strategy accordingly. Braking efficiency, stopping distance, and antilock brake control are all improved by the control strategy of the inventive subject matter.

In the foregoing specification, the invention has been described with reference to specific exemplary embodiments. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described.

For example, the steps recited in any method or process claims may be executed in any order and are not limited to the specific order presented in the claims. The equations may be implemented with a filter to minimize effects of signal noises. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

The terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

What is claimed is:

1. A method for controlling an antilock brake system on a vehicle, the method comprising the steps of:
   determining whether the vehicle is experiencing antilock brake control;
   calculating an estimation of longitudinal tire forces during periods of antilock brake control;
   calculating a prediction of longitudinal tire forces in the absence of periods of antilock brake control;
   calculating a prediction of tire normal forces from estimated and predicted longitudinal tire forces; and
   modifying a brake torque applied to a brake based on the predicted tire normal forces.

2. The method as claimed in claim 1 wherein the step of calculating a prediction of longitudinal tire forces further comprises calculating a prediction of longitudinal tire forces from predicted brake demand and predicted brake pressure.

3. The method as claimed in claim 1 wherein the step of calculating an estimation of longitudinal tire forces further comprises the step of calculating an estimation of longitudinal tire forces from estimates of current longitudinal tire forces, assessments of wheel behavior, and brake pressure trends.

4. The method as claimed in claim 3 wherein the brake pressure trends are typical pressure trends.

5. The method as claimed in claim 3 wherein the brake pressure trends are learned pressure trends.

6. The method as claimed in 1 wherein the step of calculating a prediction of tire normal forces further comprises the step of applying an assumption that a rate of change of normal tire force will increase for a master-cylinder pressure below a predetermined threshold pressure.

7. The method as claimed in 1 wherein the step of calculating a prediction of tire normal forces further comprises the step of applying an assumption that a rate of change of normal tire force will decrease for a master-cylinder pressure above a predetermined threshold pressure.

8. The method as claimed in claim 1 wherein the step of calculating a prediction of tire normal forces further comprises the step of setting a predetermined maximum predicted master-cylinder pressure.

9. The method as claimed in claim 1 wherein the step of calculating a prediction of tire normal forces further comprises the step of using information from at least one of a plurality of sources selected from the group consisting of; measured wheel-end brake pressure, estimated wheel-end brake pressure; vehicle geometry, longitudinal acceleration, a vehicle center of gravity location derived from a control algorithm, a vehicle mass, a suspension height sensor, a suspension geometry, changes in a suspension stiffness, reaction forces due to interaction of suspension forces with brake torques, grade estimates, powertrain torque, loading, operating condition, and differences in left-to-right tire normal forces due to vehicle construction.

10. The method as claimed in claim 1 wherein the step of modifying a brake torque based on the predicted tire normal forces further comprises modifying pressure commands passed to a pressure controller.

11. The method as claimed in claim 1 wherein the step of modifying a brake torque based on the predicted tire normal forces further comprises modifying pressure valve commands.

12. The method as claimed in claim 11 wherein the step of modifying pressure valve commands further comprises communicating valve commands for adjusting valve actuation times.

13. The method as claimed in claim 11 wherein the step of modifying pressure valve commands further comprises communicating valve commands for adjusting valve openings.

14. The method as claimed in claim 11 wherein the step of modifying pressure valve commands further comprises the step of modulating a valve current.

15. The method as claimed in claim 1 wherein the step of modifying a brake torque based on the predicted tire normal forces further comprises the steps of:
defining a maximum master-cylinder pressure; and
modifying a predetermined limit for the maximum master-cylinder pressure.

16. The method as claimed in claim 15 wherein the step of modifying a predetermined limit for the maximum master-cylinder pressure further comprises the step of considering a measured engine vacuum.

17. The method as claimed in claim 15 wherein the step of modifying a predetermined limit for the maximum master-cylinder pressure further comprises the step of considering an estimated engine vacuum.

18. The method as claimed in claim 15 wherein the step of modifying a predetermined limit for the maximum master-cylinder pressure further comprises the step of considering models of human apply characteristics.

19. The method as claimed in claim 15 wherein the step of modifying a predetermined limit for the maximum master-cylinder pressure further comprises the step of considering expected responses of the brake system.

20. The method as claimed in claim 1 wherein the step of modifying a brake torque based on the predicted tire normal forces further comprises:
increasing brake torque in response to an increase in the predicted normal forces; and
decreasing brake torque in response to a decrease in the predicted normal forces.

21. The method as claimed in claim 20 wherein the step of modifying a brake torque based on the predicted tire normal forces further comprises the step of applying a static modification that is invoked upon predetermined conditions being met, the predetermined conditions being such that a predetermined variation has been identified in the predicted normal forces.

22. The method as claimed in claim 20 wherein the step of modifying a brake torque based on the predicted tire normal forces further comprises the step of applying a dynamic modification that is determined as a result of any variation being identified in the predicted normal forces.

23. The method as claimed in claim 20 wherein the step of modifying a brake torque based on the predicted tire normal forces further comprises the step of applying a modification of the brake torque based on a predetermined wheel acceleration, the predetermined wheel acceleration occurring as a result of variations in predicted normal forces.

24. The method as claimed in claim 20 wherein the step of modifying a brake torque based on the predicted tire normal forces further comprises the step of applying a modification of the brake torque based on a predetermined brake pressure, the predetermined brake pressure occurring as a result of variations in predicted normal forces.

25. A method for controlling an antilock brake system for a vehicle having a wheel and brake for applying braking torque to the wheel in response to an operator brake command input, the method comprising the steps of:
calculating a prediction of brake commands;
calculating a prediction of longitudinal forces based on brake command predictions;
calculating a prediction of tire normal forces from the predicted longitudinal forces by applying an assumption that a rate of change of normal tire force will increase for master-cylinder pressures below a predetermined threshold pressure decrease for master-cylinder pressures above the predetermined threshold pressure;
modifying a braking torque applied to the brake based on the predicted normal forces.

26. The method as claimed in claim 25 wherein the step of calculating a prediction of tire normal forces further comprises the step of setting a predetermined maximum predicted master-cylinder pressure.

27. The method as claimed in claim 25 wherein the step of calculating a prediction of tire normal forces further comprises the step of using information from at least one of a plurality of sources selected from the group consisting of; measured wheel-end brake pressure, estimated wheel-end brake pressure; vehicle geometry, longitudinal acceleration, a vehicle center of gravity location derived from a control algorithm, a vehicle mass, a suspension height sensor, a suspension geometry, changes in a suspension stiffness, reaction forces due to interaction of suspension forces with brake torques, grade estimates, powertrain torque, loading, operating condition, and differences in left-to-right tire normal forces due to vehicle construction.

28. The method as claimed in claim 25 wherein the step of modifying a brake torque applied to the brake based on the predicted tire normal forces further comprises modifying pressure commands passed to a pressure controller.

29. The method as claimed in claim 25 wherein the step of modifying a brake torque applied to the brake based on the predicted tire normal forces further comprises modifying pressure, valve commands.

30. The method as claimed in claim 29 wherein the step of modifying pressure valve commands further comprises communicating valve commands for adjusting valve actuation times.

31. The method as claimed in claim 29 wherein the step of modifying pressure valve commands further comprises communicating valve commands for adjusting valve openings.

32. The method as claimed in claim 29 wherein the step of modifying pressure valve commands further comprises the step of modulating a valve current.

33. The method as claimed in claim 25 wherein the step of modifying a brake torque applied to the brake based on the predicted tire normal forces further comprises the steps of:
defining a maximum master-cylinder pressure; and
modifying a predetermined limit for the maximum master-cylinder pressure.

34. The method as claimed in claim 33 wherein the step of modifying a predetermined limit for the maximum master-cylinder pressure further comprises the step of considering a measured engine vacuum.

35. The method as claimed in claim 33 wherein the step of modifying a predetermined limit for the maximum master-cylinder pressure further comprises the step of considering an estimated engine vacuum.

36. The method as claimed in claim 33 wherein the step of modifying a predetermined limit for the maximum master-cylinder pressure further comprises the step of considering models of human apply characteristics.

37. The method as claimed in claim 33 wherein the step of modifying a predetermined limit for the maximum master-cylinder pressure further comprises the step of considering expected responses of the brake system.

38. The method as claimed in claim 25 wherein the step of modifying a brake torque applied to the brake based on the predicted tire normal forces further comprises:
increasing brake torque in response to an increase in the predicted normal forces; and
decreasing brake torque in response to a decrease in the predicted normal forces.

39. The method as claimed in claim 38 wherein the step of modifying a brake torque applied to the brake based on the predicted tire normal forces further comprises the step of applying a static modification that is invoked upon predetermined conditions being met, the predetermined conditions being such that a predetermined variation has been identified in the predicted normal forces.

40. The method as claimed in claim 38 wherein the step of modifying a brake torque applied to the antilock brake system based on the predicted tire normal forces further comprises the step of applying a dynamic modification that is determined as a result of any variation being identified in the predicted normal forces.

41. The method as claimed in claim 38 wherein the step of modifying a brake torque applied to the antilock brake system based on the predicted tire normal forces further comprises the step of applying a modification of the brake torque based on a predetermined wheel acceleration, the predetermined wheel acceleration occurring as a result of variations in predicted normal forces.

42. The method as claimed in claim 38 wherein the step of modifying a brake torque applied to the brake based on the predicted tire normal forces further comprises the step of applying a modification of the brake torque based on a predetermined brake pressure, the predetermined brake pressure occurring as a result of variations in predicted normal forces.

43. A method for controlling an antilock brake system for a vehicle having a wheel and a brake for applying braking torque to the wheel in response to an operator brake command input, the method comprising the steps of:
measuring a vehicle motion;
measuring wheel motion;
calculating an estimation of longitudinal forces based on measured vehicle motion, measured wheel motion, and known behavior of a controller in the antilock brake system;
calculating a prediction of normal forces from the estimated longitudinal forces and applying an assumption that a rate of change of normal tire force will increase for master-cylinder pressures below a predetermined threshold pressure and decrease for master-cylinder pressures above the predetermined threshold pressure; and
modifying a braking torque applied to the brake based on the predicted normal forces.

44. The method as claimed in claim 43 wherein the step of calculating a prediction of tire normal forces further comprises the step of setting a predetermined maximum predicted master-cylinder pressure.

45. The method as claimed in claim 43 wherein the step of calculating a prediction of tire normal forces further comprises the step of using information from at least one of a plurality of sources selected from the group consisting of; measured wheel-end brake pressure, estimated wheel-end brake pressure; vehicle geometry, longitudinal acceleration, a vehicle center of gravity location derived from a control algorithm, a vehicle mass, a suspension height sensor, a suspension geometry, changes in a suspension stiffness, reaction forces due to interaction of suspension forces with brake torques, grade estimates, powertrain torque, loading, operating condition, and differences in left-to-right tire normal forces due to vehicle construction.

46. The method as claimed in claim 43 wherein the step of modifying a brake torque based on the predicted tire normal forces further comprises modifying pressure commands passed to a pressure controller.

47. The method as claimed in claim 43 wherein the step of modifying a brake torque based on the predicted tire normal forces further comprises modifying pressure valve commands.

48. The method as claimed in claim 47 wherein the step of modifying pressure valve commands further comprises communicating valve commands for adjusting valve actuation times.

49. The method as claimed in claim 47 wherein the step of modifying pressure valve commands further comprises communicating valve commands for adjusting valve openings.

50. The method as claimed in claim 47 wherein the step of modifying pressure valve commands further comprises the step of modulating a valve current.

51. The method as claimed in claim 43 wherein the step of modifying a brake torque based on the predicted tire normal forces further comprises the steps of:
defining a maximum master-cylinder pressure; and
modifying a predetermined limit for the maximum master-cylinder pressure.

52. The method as claimed in claim 51 wherein the step of modifying a predetermined limit for the maximum master-cylinder pressure further comprises the step of considering a measured engine vacuum.

53. The method as claimed in claim 51 wherein the step of modifying a predetermined limit for the maximum master-cylinder pressure further comprises the step of considering an estimated engine vacuum.

54. The method as claimed in claim 51 wherein the step of modifying a predetermined limit for the maximum master-cylinder pressure further comprises the step of considering models of human apply characteristics.

55. The method as claimed in claim 51 wherein the step of modifying a predetermined limit for the maximum master-cylinder pressure further comprises the step of considering expected responses of the brake system.

56. The method as claimed in claim 43 wherein the step of modifying a brake torque based on the predicted tire normal forces further comprises:
increasing brake torque in response to an increase in the predicted normal forces; and
decreasing brake torque in response to a decrease in the predicted normal forces.

57. The method as claimed in claim 56 wherein the step of modifying a brake torque based on the predicted tire normal forces further comprises the step of applying a fixed modification that is invoked upon predetermined conditions being met, the predetermined conditions being such that a predetermined variation has been identified in the predicted normal forces.

58. The method as claimed in claim 56 wherein the step of modifying a brake torque based on the predicted tire normal forces further comprises the step of applying a dynamic modification that is determined as a result of any variation being identified in the predicted normal forces.

59. The method as claimed in claim 56 wherein the step of modifying a brake torque based on the predicted tire normal forces further comprises the step of applying a modification of the brake torque based on a predetermined wheel acceleration, the predetermined wheel acceleration occurring as a result of variations in predicted normal forces.

60. The method as claimed in claim 56 wherein the step of modifying a brake torque based on the predicted tire normal forces further comprises the step of applying a modification of the brake torque based on a predetermined brake pressure, the predetermined brake pressure occurring as a result of variations in predicted normal forces.

* * * * *